United States Patent
Mattson, Jr. et al.

(10) Patent No.: US 6,395,167 B1
(45) Date of Patent: May 28, 2002

(54) WHIRLPOOL BATH FILTER AND SUCTION DEVICE

(76) Inventors: Roy W. Mattson, Jr.; Paulette C. Ogden, both of 1732 Spencer St., Longmont, CO (US) 80501

(*) Notice: Subject to any disclaimer, the term of this patent is extended or adjusted under 35 U.S.C. 154(b) by 0 days.

(21) Appl. No.: 09/793,213

(22) Filed: Feb. 26, 2001

Related U.S. Application Data

(60) Provisional application No. 60/185,528, filed on Feb. 28, 2000.

(51) Int. Cl.⁷ ................................................ E04H 4/16
(52) U.S. Cl. ................... 210/169; 210/315; 210/416.2; 210/460; 210/463; 4/541.3
(58) Field of Search ................................. 210/169, 232, 210/314, 315, 416.2, 437, 460, 462, 463; 4/492, 541.1, 541.3, 541.4

(56) References Cited

U.S. PATENT DOCUMENTS

| | | | |
|---|---|---|---|
| 2,329,987 A | * | 9/1943 | Goodloe |
| 4,233,694 A | * | 11/1980 | Janosko et al. |
| 4,340,039 A | | 7/1982 | Hibbard et al. |
| 4,349,434 A | | 9/1982 | Jaworski |
| 4,359,790 A | | 11/1982 | Chalberg |
| 4,426,286 A | | 1/1984 | Puckett et al. |
| 4,533,476 A | | 8/1985 | Watkins |
| 4,552,658 A | | 11/1985 | Adcock et al. |
| 4,637,873 A | | 1/1987 | DeSousa et al. |
| 4,818,389 A | | 4/1989 | Tobias et al. |
| 4,971,687 A | | 11/1990 | Anderson |
| 5,236,581 A | | 8/1993 | Perry |
| 5,277,802 A | | 1/1994 | Goodwin |
| 5,328,602 A | | 7/1994 | Brooks |
| 5,383,239 A | * | 1/1995 | Mathis et al. |
| 5,656,159 A | | 8/1997 | Spencer et al. |
| 5,799,339 A | | 9/1998 | Perry et al. |
| 5,810,999 A | | 9/1998 | Bachand et al. |
| 5,928,510 A | * | 7/1999 | Meredith |
| 6,038,712 A | | 3/2000 | Chalberg et al. |
| 6,065,161 A | * | 5/2000 | Mateina et al. |
| 6,066,253 A | * | 5/2000 | Idland et al. |
| 6,283,308 B1 | | 9/2001 | Patil et al. |

OTHER PUBLICATIONS

The American Society of Mechanical Engineers, ASME/ANSI A112.19.8M–1987, Reaffirmed 1996, Suction Fittings for Use in Swimming Pools, Wading Pools, Spas, Hot Tubs, and Whirlpool Bathtub Appliances (Index plus 5 pages).
The American Society of Mechanical Engineers, ASME A112.19.7M–1995, Whirlpool Bathtub Appliances (Index plus 8 Pages).

* cited by examiner

*Primary Examiner*—David A. Simmons
*Assistant Examiner*—Fred Prince
(74) *Attorney, Agent, or Firm*—Rick Martin; Patent Law Offices of Rick Martin P.C.

(57) ABSTRACT

A whirlpool bath has a combination suction fixture and disposable filter. The suction fixture is a plastic semi-cylindrical housing attachable to the tub. A removable faceplate is reinforced and resistant to body and hair entrapment. The disposable filter is fibrous having a porous core, wherein the porous core has a series of holes and/or slots graduating in size from small at the outlet end to large at the remote end. The filter, sloped floor of the housing and drain slots provide for low water retention during shutdown.

29 Claims, 7 Drawing Sheets

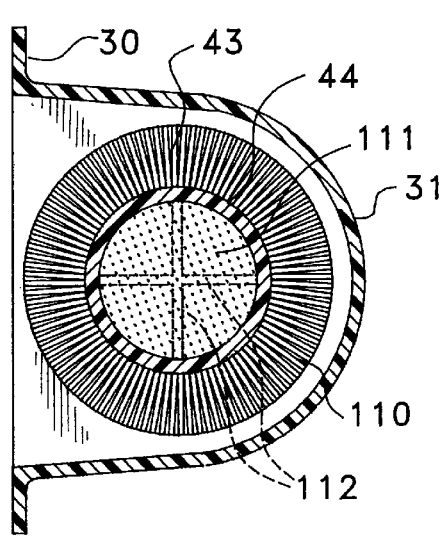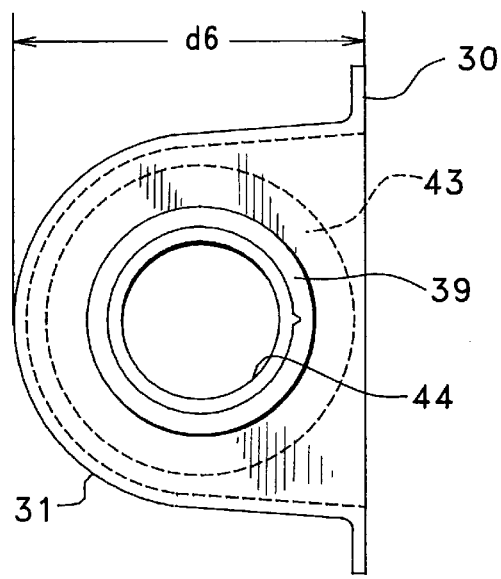
FIG. 12  FIG. 13
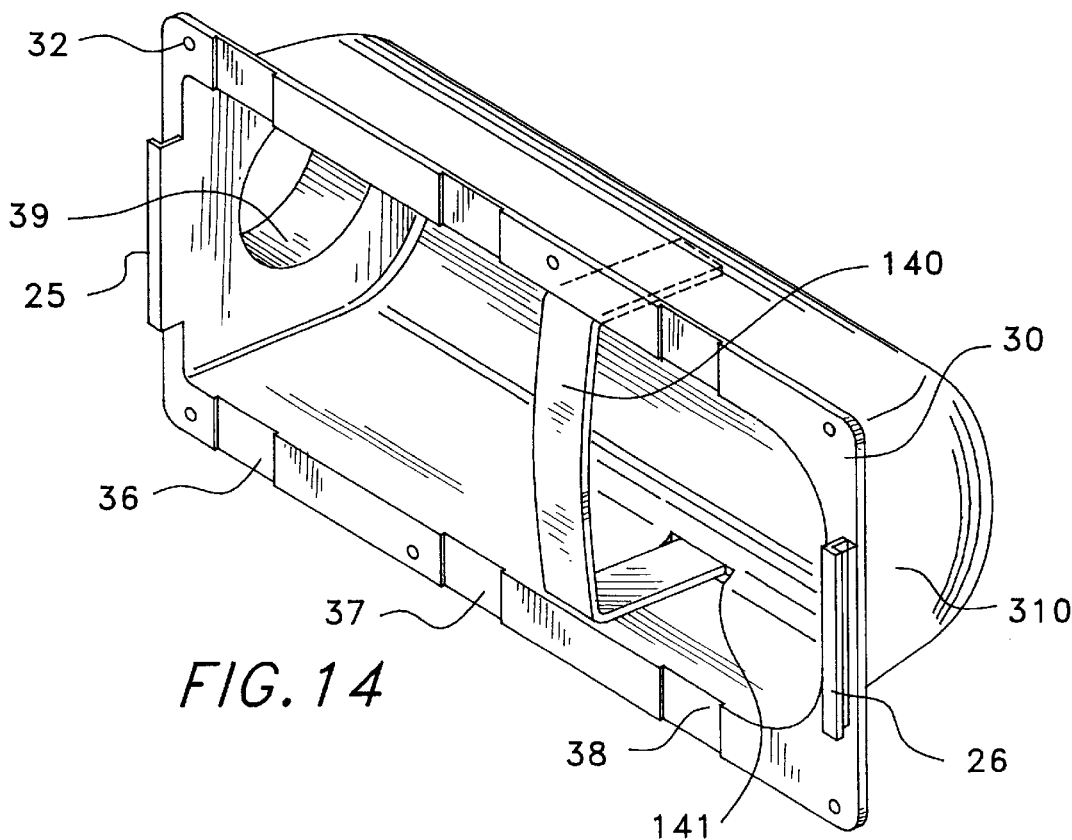
FIG. 14

WHIRLPOOL BATH FILTER AND SUCTION DEVICE

CROSS-REFERENCE TO RELATED APPLICATION

This application is a non-provisional application claiming the benefits of provisional application No. 60/185,528 filed Feb. 28, 2000.

FIELD OF THE INVENTION

The present invention relates to combining a replaceable filter and a suction device in a closed loop home or hotel whirlpool baths, hydrotherapeutic baths, and other bathing receptacles.

BACKGROUND OF THE INVENTION

Whirlpool-type baths have been employed to treat discomfort resulting from strained muscles, joint ailments and the like. More recently, such baths have been used increasingly as means of relaxing from the daily stresses of modern life. A therapeutic effect is derived from bubbling water and swirling jet streams that create an invigorating to massage the user's body.

To create the desired whirlpool motion and hydro massage effect a motorized water pump draws water in through a suction fitting in a receptacle, such as a bathtub. The user first fills the bathtub. Then the user activates the closed loop whirlpool system. The water travels through a piping system and back out jet fittings. Jet fittings are typically employed to inject water at a high velocity into a bathtub. Usually the jet fittings are adapted to aspirate air so that the water discharged into the receptacle is aerated to achieve the desired bubbling effect. (See for instance, U.S. Pat. No. 4,340,039, incorporated herein by reference).

Whirlpool baths currently do not have a filtration system to filter debris in the water as do indoor and outdoor spas. Whirlpool baths are designed as with a normal bathtub to be drained after each use. However, debris in the form of dead skin, soap, hair and other foreign material circulates throughout the piping and pump system. This debris does not completely drain and over time accumulates in the piping system and may cause a health risk. Also hair may get twisted and entrapped in the whirlpool bath pump's impeller. Whirlpool bath manufacturers for some time have been trying to devise a way to incorporate a filtration system on a closed loop whirlpool bath. The major obstacle they face in using a filtration system for a whirlpool bath is in complying with the plumbing codes. There is no filtration system that is specifically designed for a drain down whirlpool bath that allows a whirlpool bath to pass requirements set forth by plumbing codes.

Whirlpool baths must meet stringent drain down code requirements set up by the American Society of Mechanical Engineers (ASME). The code that governs whirlpool baths is entitled "Whirlpool Bath Appliances" (ASME A112.19.7M 1995). Section 5 of this code covers water retention. It states the "whirlpool bath appliances shall be of such design as to prevent retention of water in excess of 44 ml. (1½ fl oz) for each jet and suction fitting. The average whirlpool bath has a 6-jet system and has one suction fitting. This system configuration can only retain 10½ ounces of water in the complete whirlpool bath system after draining to meet code. This is for a six jet one suction whirlpool bath. Most quality whirlpool baths retain less than 4 ounces of water in the whirlpool bath system after draining. Therefore, the filter part of the system cannot retain over six and a half ounces of water, because the total water retention would exceed 10½ ounces. These requirements for whirlpool baths fall under the American Society of Mechanical Engineers code entitled "Whirlpool Bathtub Appliances." Currently there are no filtration systems designed for whirlpool baths. Currently there are no filtration systems designed for whirlpool baths that retain less than 7 ounces of water except for the present invention.

Another important consideration in developing a filtration system for whirlpool baths is the ease of replacing the filter. It needs to be designed so the filter can be replaced from inside the bath. This way access panels on the underside of the whirlpool bath to access the filter can be eliminated. The most logical choice for a filter location is in the suction fitting. Placing the filter in the suction fitting presents a whole other range of design concerns. First placing a filter in the suction fitting might cause undue stress on the pump motor. The suction filter must pass the codes set up by ASME for suctions. The code for suctions from ASME is titled Suction Fittings for use in swimming pools, spas, hot tubs, and whirlpool bathtub appliances (ASME/ANSI A112.19M-1987 reaffirm 1996). There are a variety of load and structural tests the suctions have to pass. Section 4. of the ASME standard had to be passed. Also section 7 of the ASME A112.19.7M-1995, the hair entrapment test, had to be passed. The present invention provides a cavity that houses a filter that could be installed to have the filter replaced from the inside of a whirlpool bath. The complete filtration system retains less than seven ounces of water and as little as four ounces of water; so most whirlpool bath companies could use it on their whirlpool bath models and pass the drain down codes for whirlpool baths. The filter had to be made small to meet the drain down requirements. However, since it was small it had to be very efficient. The present invention has a specially designed filter core. The core is engineered with varying spaced and sized holes along the length of the core. This design allows water to be drawn through just about the entire filter. Without this design the filter would only pull water through about 20% of the filter.

The present invention also provides a new face plate cover. This cover has to be easily removable. It also has to pass the heavy load, impact and hair entrapment tests set out by Section 4 of the ASME/ANSI A112.19.8M-1987 reaffirm 1996). The cover has a radius and back ribbing on it and a removable insert support to pass the strength tests. The cover has just the right amount of sized holes to pass the hair entrapment tests. The result is the fluid suction filter device that is especially made just for whirlpool baths.

U.S. Pat. No. 4,340,039 (1982) to Hibbard et al. discloses a hydromassage apparatus for a whirlpool bath system. It has a closed loop water circulation system, adjustable nozzles and venturi air injector, (incorporated herein by reference).

U.S. Pat. No. 4,637,873 (1987) to DeSousa et al. discloses a front load skimmer type filter for spas and pools. A skimmer housing supports a polyester fabric filter having pleated filter media and a central polyvinyl chloride (PVC) pipe with a porous core, a solidified potting compound for a solid top, and an open bottom. It does not support a series of expanding diameter holes for the porous core as does the present invention, (incorporated by reference). It does not meet draindown requirements of ASME for whirlpool baths as does the present invention.

U.S. Pat. No. 4,349,434 (1982) to Jaworski discloses a filtration system piped in away from a pool, spa, hot tub and the like. A filter cartridge and filter is used.

U.S. Pat. No. 4,359,790 (1982) to Chalberg discloses a three piece whirlpool bath suction outlet assembly.

SUMMARY OF THE INVENTION

The main aspect of the present invention is to provide in a whirlpool bath a suction fixture and replaceable filter combination apparatus.

Another aspect of the present invention is to provide a safety plate for the suction intake which resists hair entrapment.

Another aspect of the present invention is to provide a minimal water retention filter to retain less than seven ounces of water after draindown.

Another aspect of the present invention is to provide a housing which is readily retrofitable and/or incorporated into a new whirlpool bath that retains minimal water.

Other aspects of this invention will appear from the following description and appended claims, reference being made to the accompanying drawings forming a part of this specification wherein like reference characters designate corresponding parts in the several views.

The housing of the suction filter is generally rectangular having a length of one to two feet. A semi-cylindrical recess extends behind the installation wall of the tub. The recess surrounds a disposable cylindrical fiber filter which has a support tube in its core. The support tube has a plurality of water holes having increasing diameters extending away from the water outlet. These holes provide for a water flow along the entire length of the filter, instead of just making use of the filter at the outlet and of the filter.

The housing has a sloped lower shelf and slots to allow water to drain back into the tub after shutdown. The housing has a sharp radius end opposite the outlet end, thus allowing the housing to be fitted into the side wall of a tub through a standard size opening cut.

The housing mounting flange has nominally ten counter sunk holes for bolting to the tub via standard nuts and bolts. Silicone is used on the back of the housing flange to prevent leaks.

The faceplate slides into the housing to provide for filter replacement. The faceplate has a radius shape to prevent a limb from being sucked up against it which could entrap a body part. ASME hair entrapment standards are met using a plurality of holes. Impact and load tests are met.

BRIEF DESCRIPTION OF THE DRAWINGS

FIG. 12 is a cross sectional view taken along line 12—12 of FIG. 11.

FIG. 13 is a plan view of the outlet end of the housing.

FIG. 14 is a top perspective view of the housing with an optional mounting bracket for the filter.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
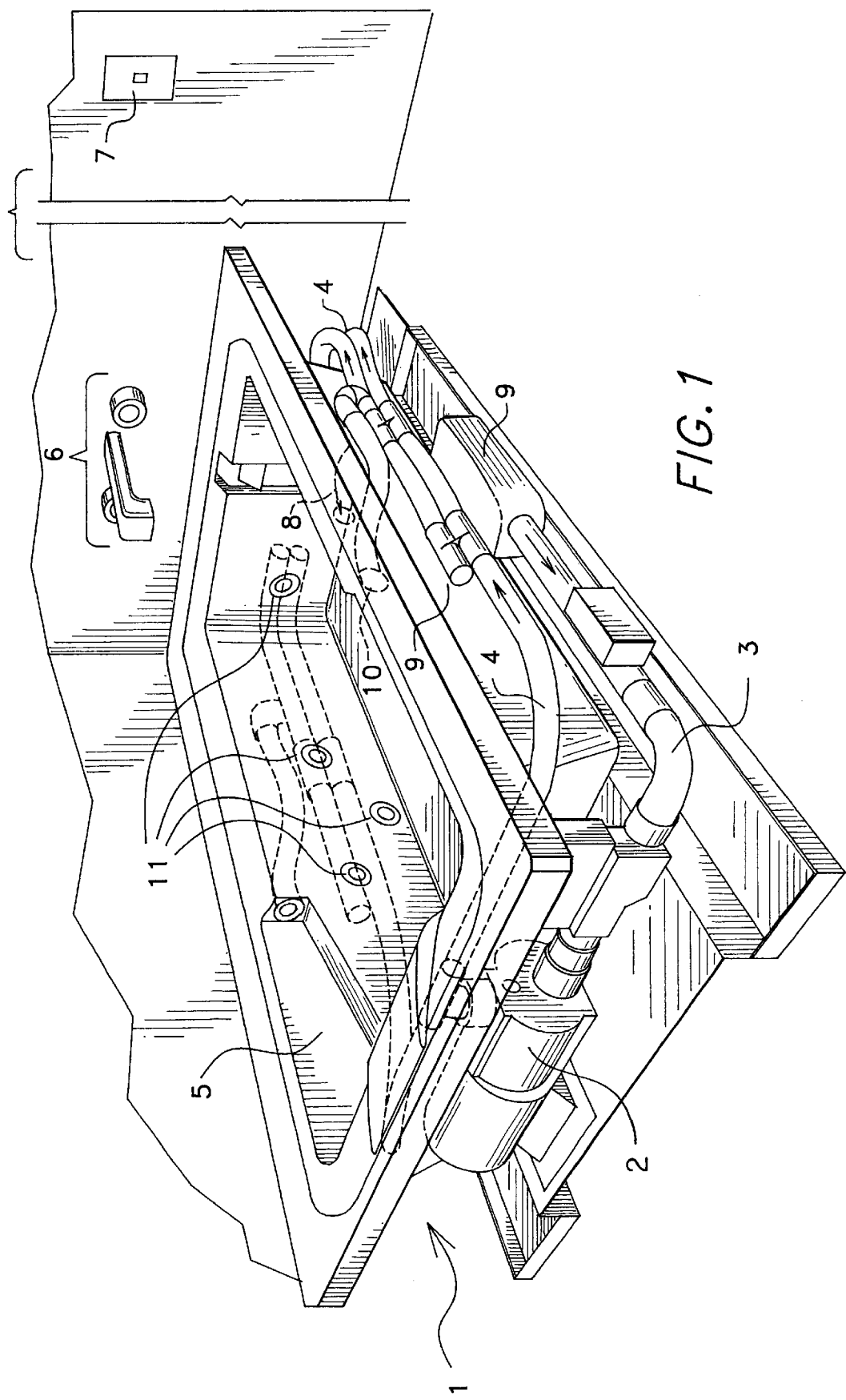
FIG. 1 is a top perspective view of a whirlpool bath having the preferred embodiment of the suction filter installed therein.

Referring first to FIG. 1 a whirlpool bath 1 has a tub 5 with a standard faucet and spicket assembly 6 and a standard tub drain 8. During whirlpool use the pump 2 circulates water via output pipe 4, air mixing pipe 10 and jets 11. Water is drawn from the filled tub via pump inlet pipe 3 which is connected to the suction filter 9, the preferred embodiment. A switch 7 activates the pump 2.

Figure 2:
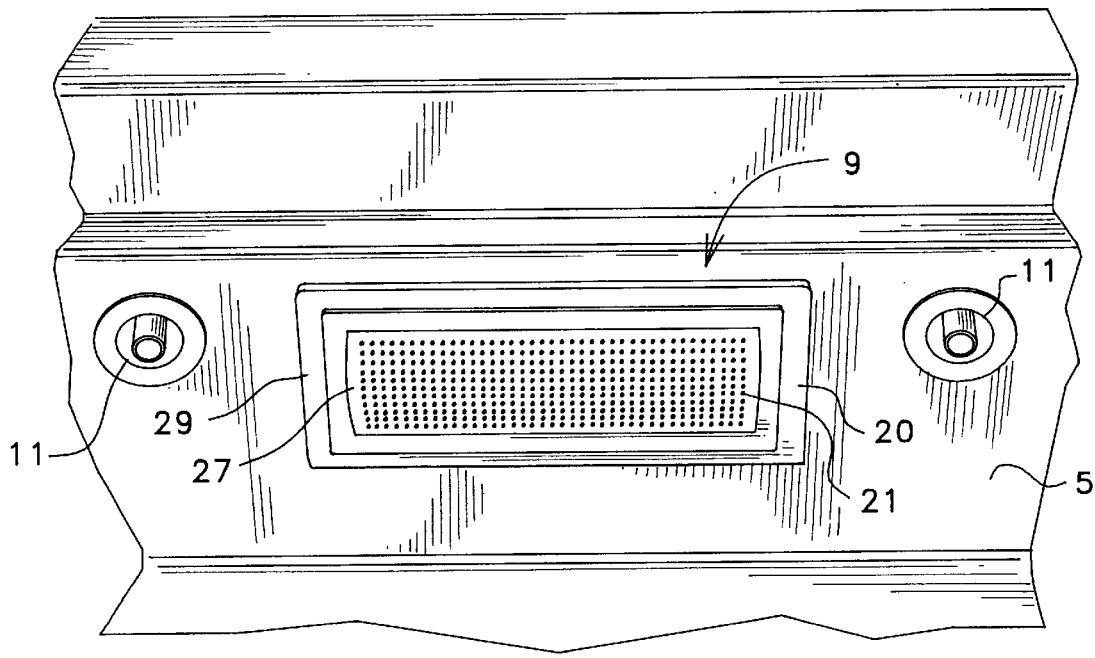
FIG. 2 is a top perspective view of the faceplate of the suction filter as viewed from the inside of the whirlpool bath shown in FIG. 1.
Figure 4:
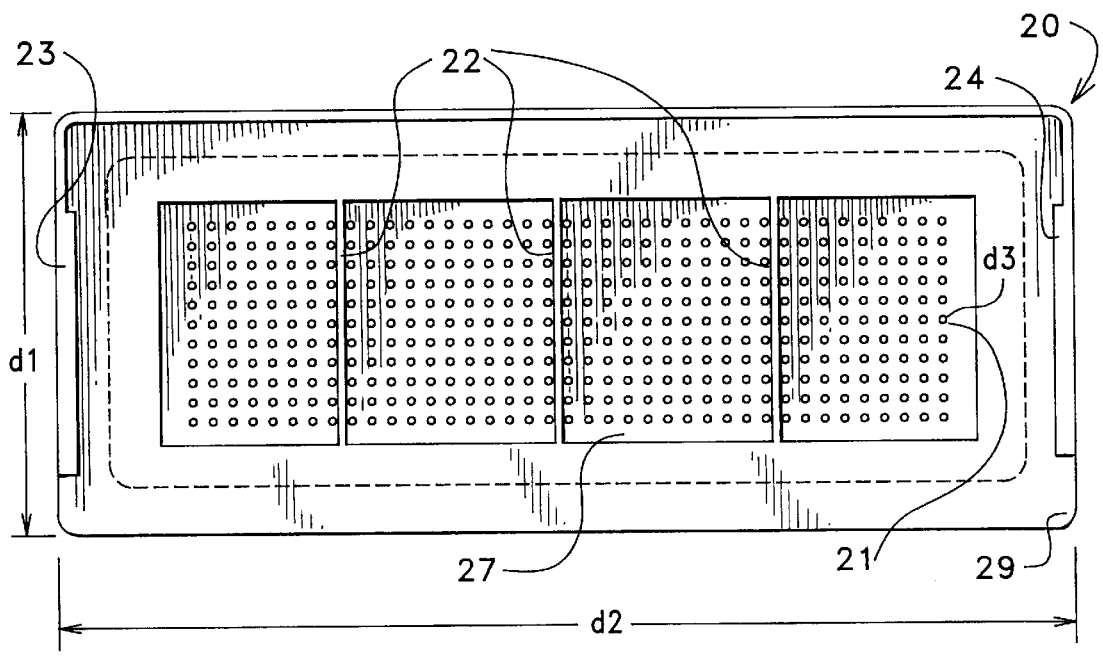
FIG. 4 is a back plan view of the faceplate shown in FIG. 2.
Figure 3:
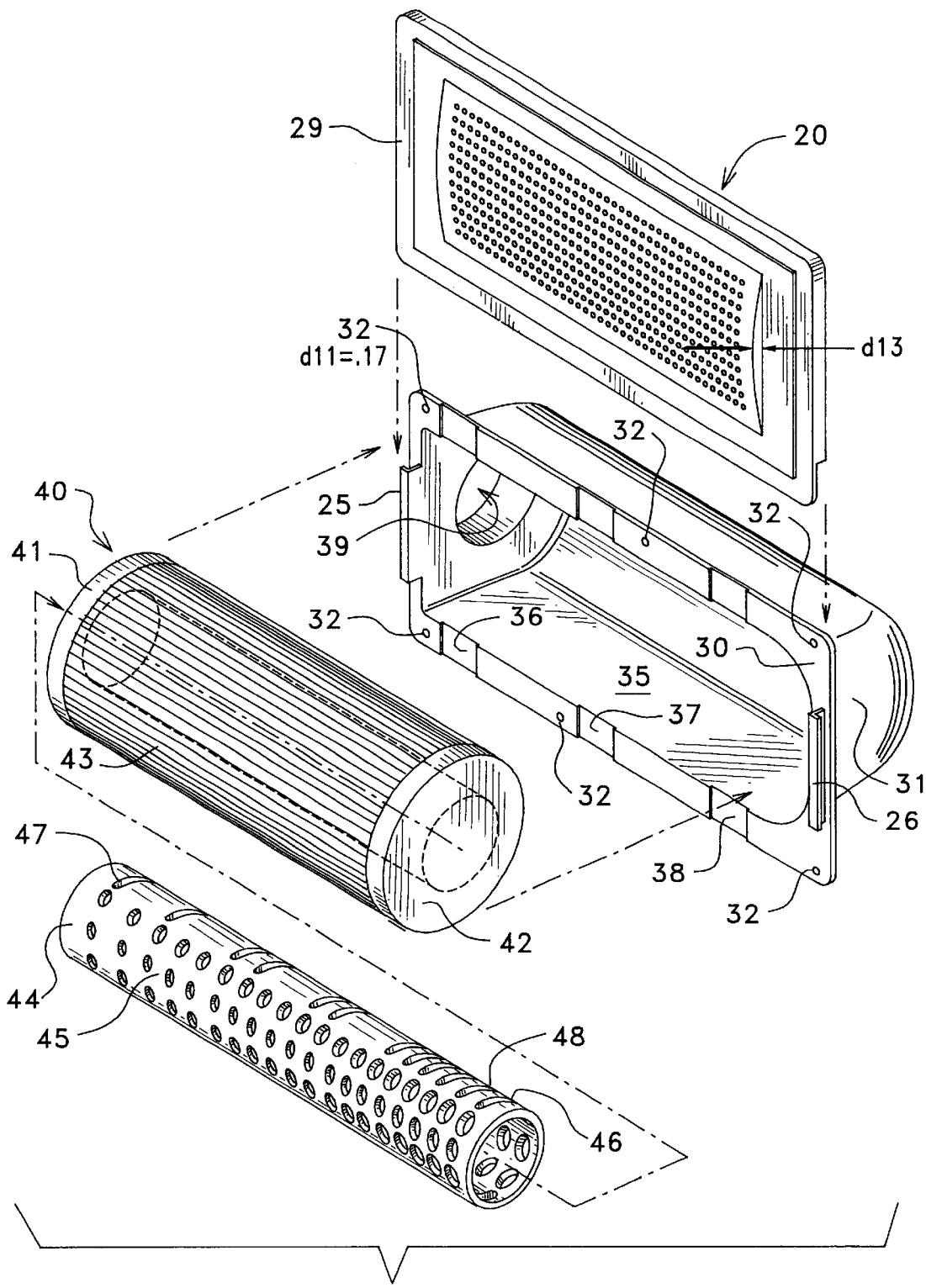
FIG. 3 is an exploded view of the suction filter shown in FIG. 2.

Referring next to FIGS. 2,3,4 the suction filter 9 is shown as seen by a bather in the tub in FIG. 2. The jets 11 are prior art. The only visible portion of the suction filter 9 is the faceplate 20. The faceplate 20 is preferably rectangular but could have any shape. The faceplate 20 has a peripheral mounting flange rim 29 which has receiving grooves 23,24 to slidingly engage L shaped brackets 25,26. The brackets 25,26 are molded into the mounting flange 30 of the filter housing 31.

The faceplate 20 has a raised convex center 27 which is perforated with a plurality of inlet holes 21 to allow the recirculating water to enter the filter housing 31. The rear of the faceplate 20 has support ribs 22 to strengthen the center 27 to prevent crushing. Hair entrapment is prevented typically in a 1–1½ inch piping system flowing at about 50 gallons per minute with a hole pattern of about 25 holes per square inch at about 0.25 inches O.D.

The filter housing 31 has mounting holes 32 on its mounting flange 30 for attachment to the inner wall of the tub 5 via bolts (not shown), wherein silicone is used behind the mounting flange 30.

The floor 35 of the filter housing 31 slopes downward into the drain slots 36,37,38.

The replaceable filter 40 has a standard fibrous, folding membrane 43 supported at its outlet end by an outlet cap 41 and at its closed end by an end cap 42. The porous core 44 is preferably an ABS pipe mountable in filter housing outlet 39. The holes range from small 45 at the outlet end to large 46 at the closed end adjacent the end cap 42. The slots also range from small 47 to large 48 in a similar fashion, wherein the increasing hole and slot sizes from the outlet end distribute the water flow across the entire length of the membrane 43. Without the hole and slot enlarging feature, the water would only be filtered by a small portion of the membrane near the outlet 39.

Figure 5:
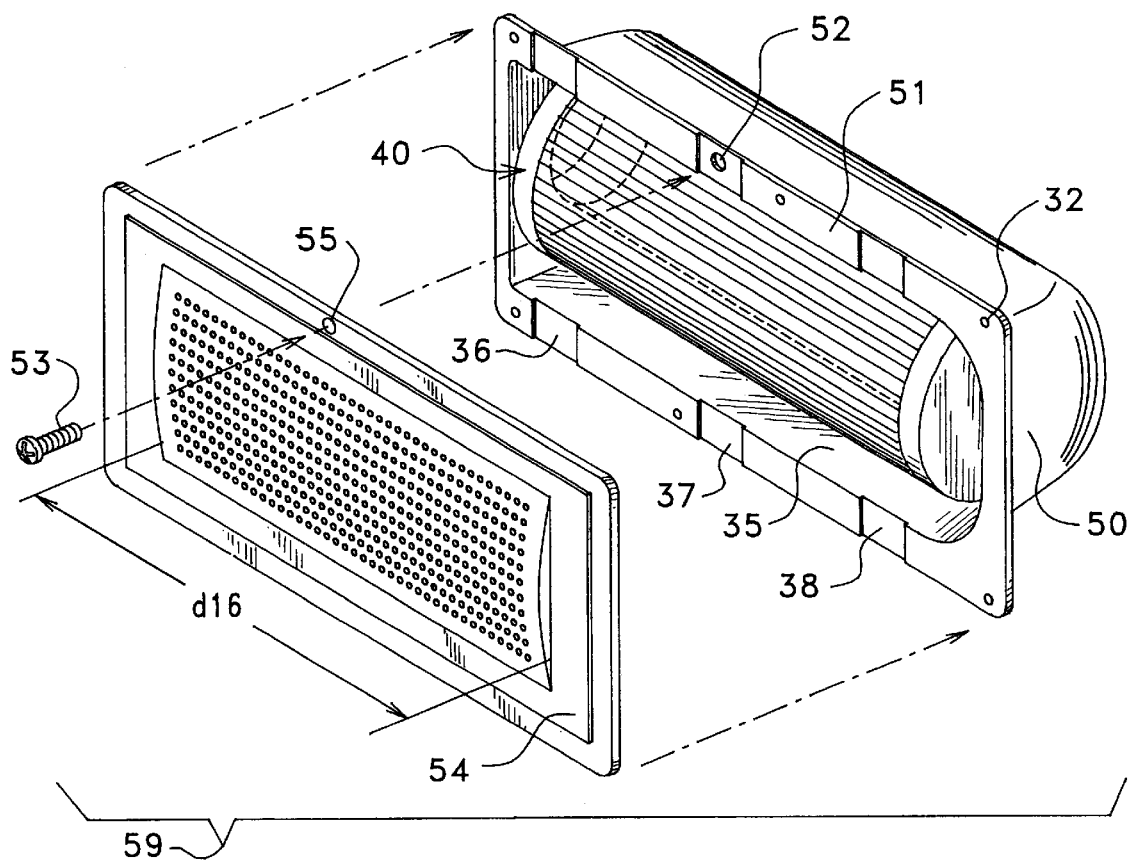
FIG. 5 is a top perspective view of an alternate embodiment faceplate.

Referring next to FIG. 5 an alternate embodiment filter housing 50 has a flange 51 with receiving holes 52 for bolts 53 which mount a faceplate 54 to the flange 51. Multiple holes 55,52 may be used. All other features of the assembly 59 are the same as the preferred embodiment.

Figure 6:
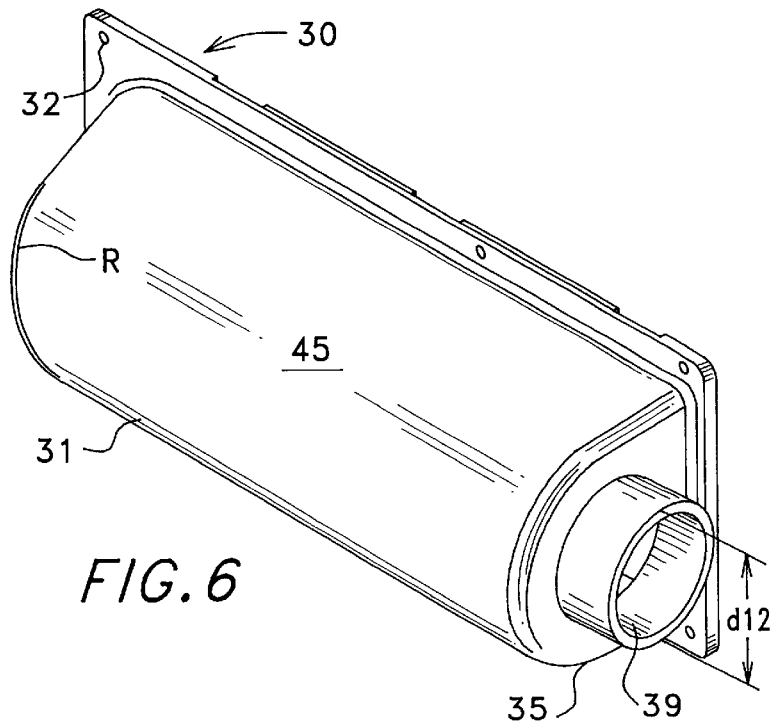
FIG. 6 is a back perspective view of the housing of the suction filter shown in FIG. 2.

Referring next to FIG. 6 the filter housing 30 is seen to have an arcuate top rear and rear wall 31 generally shaped like a semi-cylinder when integrated with the floor 35 (also called a trapepize shape). The relatively sharp radius R allows the housing 31 to be readily installed into a standard size opening cut or formed into the sidewall of the tub, by tilting the housing sideways to allow the outlet 39 to fit.

Figure 7:
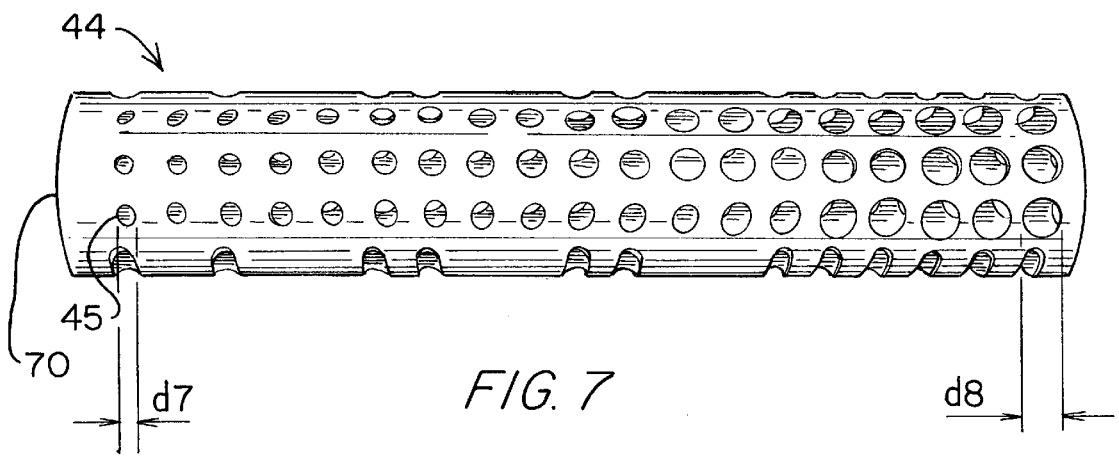
FIG. 7 is a plan view of the porous core of the filter.
Figure 8:
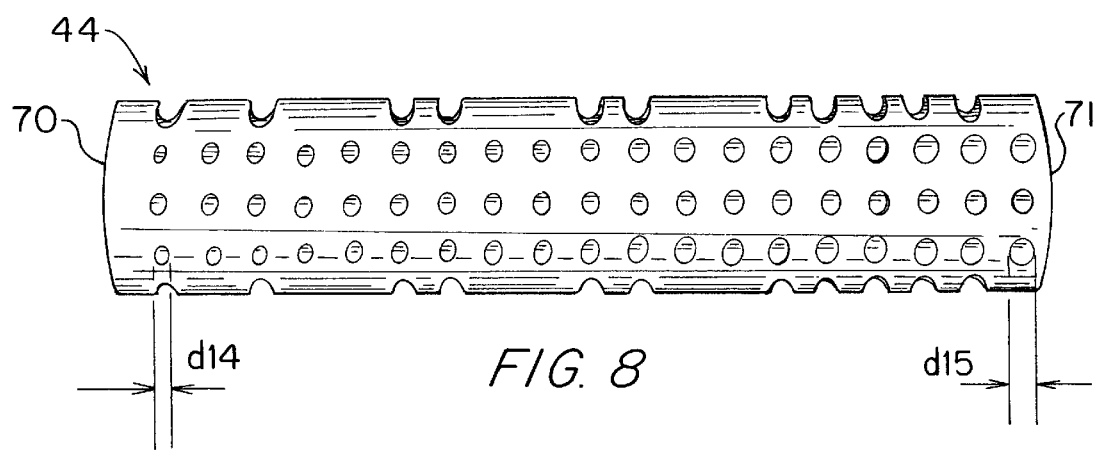
FIG. 8 is the same view as FIG. 7 with the porous core rotated 90° clockwise.
Figure 9:
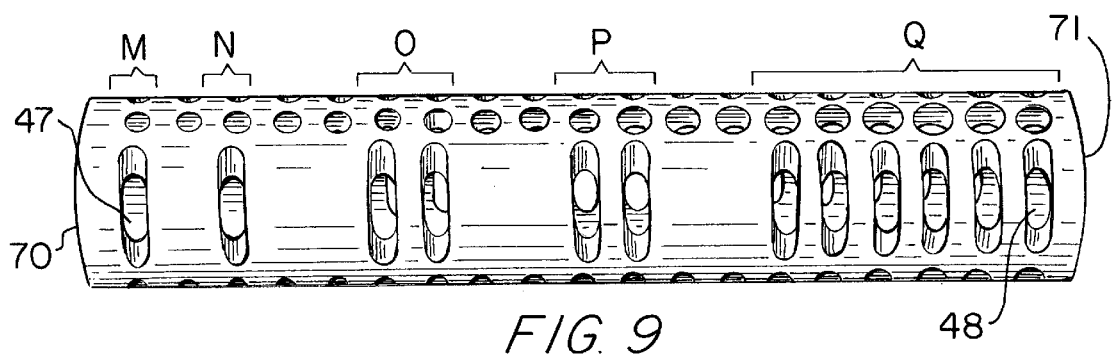
FIG. 9 is the same view as FIG. 8 with the porous core rotated another 90° clockwise.

Referring next to FIGS. 7,8,9 the porous core 44 has an outlet end 70 and a remote end 71. The holes and/or slots at the remote end 71 are larger than the holes and/or slots at the outlet end 70. Also slot groups M,N,O,P,Q have ascending valves of slot numbers as they approach the remote end.

Figure 10:
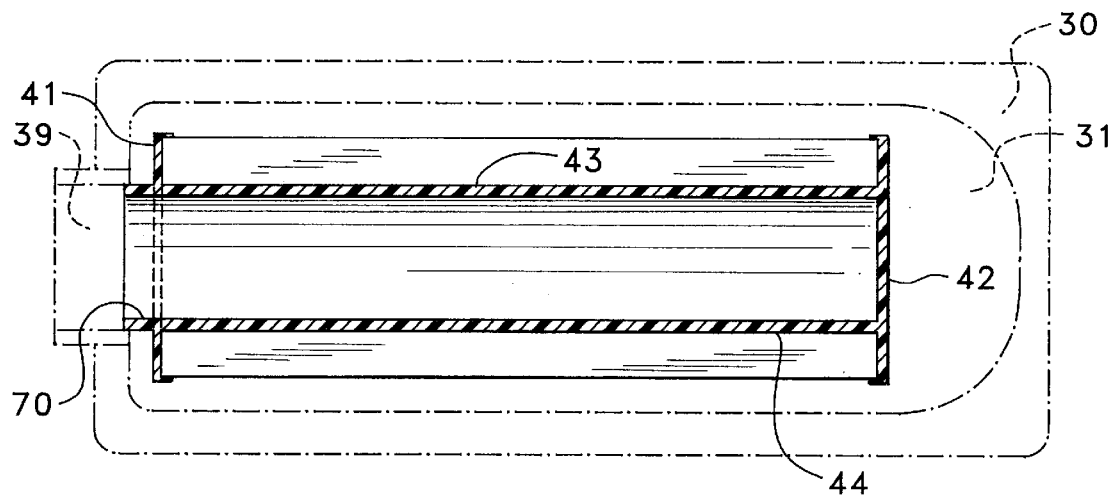
FIG. 10 is a longitudinal sectional view of the housing and filter of FIG. 2.

FIG. 10 shows how the outlet end 70 of the porous core 44 fits into the outlet 39 of the filter housing 31.

Figure 11:
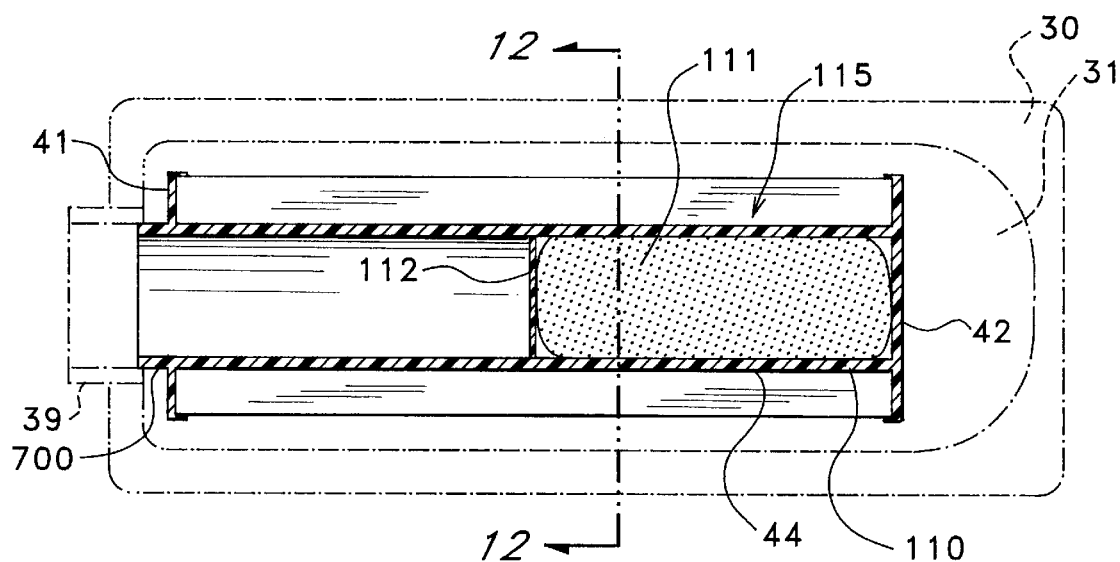
FIG. 11 is a longitudinal sectional view of an alternate embodiment filter having a charcoal bag in the porous core.

FIGS. 11,12 show an alternate embodiment filter assembly 115 having a charcoal bag filter 111 in the center of the porous core 110 and remote from the outlet end. The crosshairs 112 of the core 110 prevent the bag from entering the outlet 39, wherein the outlet end 700 fits into the outlet 39 the same as the preferred embodiment.

FIG. 13 shows an outlet end plan view of the preferred embodiment.

Referring next to FIG. 14 an alternate embodiment housing 310 has inside notches 141 to receive a U shaped brace 140.

| Nominal Dimensional Measurements Are: | | |
|---|---|---|
| d1 | 5.40 | inches |
| d2 | 12.77 | inches |
| d3 | .25 | inches (O.D.) |
| d4 | Blank | |
| d5 | Blank | |
| d6 | 3.50 | inches |
| d7 | 6/32 | inches (O.D.) |
| d8 | 11/32 | inches (O.D.) |
| d9 | Blank | |
| d10 | Blank | |
| d11 | .17 | inches (O.D.) |
| d12 | 2.27 | inches (O.D.) |
| d13 | R5.0 | inches (Radius) |
| d14 | 4/32 | inches (O.D.) |
| d15 | 9/32 | inches (O.D.) |
| d16 | 10.00 | inches |

Although the present invention has been described with reference to preferred embodiments, numerous modifications and variations can be made and still the result will come within the scope of the invention. No limitation with respect to the specific embodiments disclosed herein is intended or should be inferred.

We claim:

1. A combination water filter and suction device comprising:
    a housing having a mounting surface for providing a flush mount to an inside of a tub, below a fill line of the tub;
    said housing having an input orifice and an output orifice, and a shape to enable complete drainage;
    said input orifice having a vertically oriented porous face plate; and
    a removable filter mounted inside the housing, thereby providing a suction device to intake all the water in the tub from underwater, not on a surface of the water, and to continuously filter said water with a replaceable filter.

2. The apparatus of claim 1, wherein the mounting surface further comprises a peripheral flange having a drainage slot.

3. The apparatus of claim 2, wherein the input orifice further comprises a rectangular shape, and the housing further comprises a radiused semi-cylindrical shape to provide insertability into a rectangular opening in a tub and complete drainage of water in the housing.

4. The apparatus of claim 1, wherein the vertically oriented porous faceplate further comprises a plurality of holes at least about 25 holes per square inch, each hole about 0.25 inches O.D.

5. The apparatus of claim 1, wherein the vertically oriented porous face plate further comprises a plurality of holes per square inch and each hole having a diameter, wherein hair cannot become entrapped in the holes with the use of a pump that allows about 50 gallons per minute flow and about 1–1½ inch piping system.

6. The apparatus of claim 5, wherein the vertically oriented porous faceplate further comprises a convex outer surface to prevent body part entrapment.

7. The apparatus of claim 5, wherein the housing further comprises a brace to reinforce the vertically oriented porous faceplate.

8. The apparatus of claim 1, wherein the removable filter further comprises an internal core, said core having a plurality of holes with ascending size away from the output orifice to allow an efficient use of a surrounding filter, said surrounding filter holding less than seven ounces of water after drainage.

9. The apparatus of claim 8, wherein the internal core supports a secondary filter inside it.

10. In combination with a whirlpool bath, said whirlpool bath having a tub, the tub having an inside surface, a closed loop piping system, a water pump, output jets and a suction device, the improvement comprising:
    a housing having a flange for a flush mount on the inside surface;
    the housing having an input orifice comprising an open wall contiguous with the inside surface, and an output orifice;
    the input orifice having a porous face plate; and
    a removable filter mounted inside the housing, thereby providing a single combination filter and suction device for the whirlpool bath.

11. The improvement of claim 10, wherein the housing further comprises a drainage slot.

12. The improvement of claim 10, wherein the housing further comprises a sloped rear panel to provide complete drainage.

13. The improvement of claim 12, wherein the removable filter further comprises a water retention of less than seven ounces after draining.

14. The improvement of claim 10, wherein the porous face plate further comprises an anti-hair entrapment design.

15. The improvement of claim 14, wherein the porous face plate further comprises a convex outer surface to prevent body entrapment.

16. The improvement of claim 10, wherein the removable filter further comprises an internal core having holes with an ascending size pattern away from the output orifice to provide an efficient use of a surrounding filter.

17. The improvement of claim 16, wherein the internal core further comprises a secondary filter inside it.

18. The improvement of claim 10, wherein the housing further comprises a support bracket to reinforce the porous face plate.

19. A combination water filter and suction device for a whirlpool bath, the device comprising:
    housing means functioning to support a removable filter means and provide an inlet opening contiguous with an inner surface of the whirlpool bath; and face plate means functioning to cover the inlet opening and prevent body entrapment, hair entrapment, and prevent accidental breakage thereof.

20. The apparatus of claim 19, wherein the removable filter retains less than seven ounces of water after drainage.

21. A combination water filter and suction device comprising:

a housing having a mount for providing a flush mount to an inside of a tub, below a fill line of the tub;

said housing having an input orifice and an output orifice, and a shape to enable complete drainage;

said input orifice having a vertically oriented flow through faceplate;

said output orifice having an extension from a side of the housing; and a removable filter mounted inside the housing and adjacent to the extension, thereby providing a suction device to intake all the water in the tub from underwater and to continuously filter said water with a replaceable filter; and said housing having a sloped bottom and a drawings outlet.

22. The apparatus of claim 21, wherein the input orifice further comprises a rectangular shape, and the housing further comprises a radiused semi-cylindrical shape to provide insertability into a rectangular opening in the tub.

23. The apparatus of claim 21, wherein the vertically oriented flow through faceplate further comprises a plurality of holes.

24. The apparatus of claim 21, wherein the removable filter further comprises an internal core, said core having a plurality of holes with ascending size away from the output orifice to allow an efficient use of a surrounding filter, said surrounding filter holding less than seven ounces of water after drainage.

25. The apparatus of claim 24, wherein the internal core supports a secondary water purifying device inside it.

26. The apparatus of claim 21, wherein the housing and faceplate combination further comprise a brace to reinforce the vertically oriented flow through faceplate.

27. In combination with a whirlpool bath system, said whirlpool bath system having a tub, the tub having an inside surface, said system having a closed loop piping system, a water pump, output jets and a suction device, the improvement comprising:

a housing having a flange for a flush mount on the inside surface;

the housing having an input orifice comprising an open wall contiguous with the inside surface and a sloped bottom with a drain;

the housing having a side wall with an outlet port;

the input orifice having a flow through faceplate;

a removable filter mounted inside the housing, thereby providing a single combination filter and suction device for the whirlpool bath;

wherein the flow through faceplate further comprises an anti-hair entrapment design;

wherein the removable filter further comprises an internal core having holes with an ascending size pattern away from the outlet port;

wherein the housing and faceplate combination further comprise a support bracket to reinforce the faceplate; and wherein the removable filter further comprises a water retention of less than seven ounces after draining.

28. The improvement of claim 27, wherein the internal core further comprises a secondary filter inside it.

29. A combination water filter and suction device for a whirlpool bath, the device comprising:

housing means functioning to support a removable filter means and provide an inlet opening contiguous with an inner surface of the whirlpool bath;

faceplate means functioning to cover the inlet opening and prevent body entrapment, hair entrapment, and prevent accidental breakage thereof;

wherein the removable filter retains less than seven ounces of water after drainage;

said housing means and faceplate means together having a support to resist breaking the faceplate means;

said housing means having a sloped bottom and a drainage port;

said housing means having a side panel with an outlet port which supports the removable filter means; and the removable filter means having a core with an ascending hole size pattern starting with a small hole adjacent the outlet port.

* * * * *